(12) United States Patent
Park et al.

(10) Patent No.: US 7,518,282 B2
(45) Date of Patent: Apr. 14, 2009

(54) ROTOR, VIBRATION MOTOR HAVING THE SAME, AND FABRICATION METHOD THEREOF

(75) Inventors: Jae-Woon Park, Suwon-si (KR); Ki-Hyung Kim, Gunpo-si (KR); Duck-Shik Kim, Anyang-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 308 days.

(21) Appl. No.: 11/517,419

(22) Filed: Sep. 8, 2006

(65) Prior Publication Data

US 2007/0057586 A1 Mar. 15, 2007

(30) Foreign Application Priority Data

Sep. 9, 2005 (KR) .................. 10-2005-0084297

(51) Int. Cl.
*H02K 1/22* (2006.01)
(52) U.S. Cl. ................. 310/268; 310/71; 310/81; 310/233
(58) Field of Classification Search ............. 310/71, 310/81, 261, 268, 233–235
See application file for complete search history.

(56) References Cited

U.S. PATENT DOCUMENTS 4,594,524 A * 6/1986 Sudo ................... 310/68 R
6,291,915 B1 * 9/2001 Yamaguchi ................. 310/71
6,384,499 B2 * 5/2002 Yamaguchi ................. 310/81
6,630,759 B2 * 10/2003 Yamaguchi ................. 310/71
6,674,202 B2 * 1/2004 Yamaguchi ................ 310/128
6,909,206 B2 * 6/2005 Koyanagi et al. ............ 310/43
2001/0040413 A1 * 11/2001 Yamaguchi ................. 310/81
2005/0285470 A1 * 12/2005 Itoh et al. .................. 310/208

* cited by examiner

*Primary Examiner*—Thanh Lam

(57) ABSTRACT

A rotor, vibration motor having the same, and fabrication method thereof are disclosed. A rotor according to an embodiment of the invention comprises a first layer on which are formed a plurality of commutators, a second to an n-th layer—wherein n is 4 or greater—on which are formed a plurality of patterned coils that are connected with the commutators, insulation layers interposed in-between the first to the n-th layers; blind via holes which connect the commutators of the first layer with the patterned coils formed on the second layer and which connect the patterned coils formed on the (n−1)-th layer with the patterned coils formed on the n-th layer, and a plurality of through holes which connect the patterned coils formed on the second to the (n−1)-th layers, where the patterned coils located on the second to the (n−1)-th layers are connected by means of different through holes.

24 Claims, 14 Drawing Sheets

ROTOR, VIBRATION MOTOR HAVING THE SAME, AND FABRICATION METHOD THEREOF

CROSS-REFERENCE TO RELATED APPLICATIONS

This application claims the benefit of Korean Patent Application No. 2005-0084297 filed with the Korean Intellectual Property Office on Sep. 9, 2005, the disclosure of which is incorporated herein by reference in its entirety.

BACKGROUND

1. Technical Field

The present invention relates to a rotor, a vibration motor having the same, and a fabrication method of thereof.

2. Description of the Related Art

The vibration motor having an eccentric rotor is currently widely used in mobile phones and PDAs, etc., as a means of creating vibration upon receipt of incoming calls. As telecommunication devices decrease in size, the demand for smaller and thinner vibration motors is also increasing.

FIG. 1 is a cross-sectional view illustrating the structure of a conventional vibration motor. The conventional vibration motor has a bracket 1 at the bottom. One end of a shaft 9 is inserted and secured to the center of the bracket 1, and the other end of the shaft 9 is secured by a case 8. The case 8 protects the other parts of the vibration motor from external interferences. A flexible board 12 of minute thickness is placed on the top of the bracket 1.

A multi-polar magnet 2 with alternating N, S poles along its circumference is placed on the perimeter of the central flexible board 12, and in the central cavity of the magnet 2, a pair of brushes 3 are positioned at a designated angle with the lower ends attached to the flexible board 12. A bearing 11 is inserted onto a designated position of the shaft 9, and an eccentric rotor 10 is inserted onto the perimeter of the bearing 11. A plurality of commutators 7 that are in contact with the brushes 3 are positioned on the bottom of the rotor 10.

FIG. 2a is a perspective view illustrating the upper portion of the conventional eccentric rotor 10.

As shown in FIG. 2a, the rotor 10 is equipped with a board 4 that is cut from a flat circular plate, and a plurality of wound coils 5 arranged in designated angles are positioned on the upper surface of the board 4. Also, a weight 13 that increases the eccentricity of the rotor 10 is located on the board 4 between the wound coils 5. The wound coils 5 and weight 13 are secured to the board 4 by, for example, a molded form 6 made of a material such as plastic, etc.

FIG. 2b is a perspective view illustrating the bottom of the conventional eccentric rotor 10. As shown in FIG. 2b, the commutators 7 of a flat plate shape are arranged radially around the rotation axis of the rotor 10 on the bottom of the board 4.

In such a vibration motor, the rotor 10 is rotated by the electromagnetic interaction between the wound coils 5 and magnet 2, as electric currents from an external source are supplied through the flexible board 12 and brushes 3 to the wound coils 5. The rotor 10 is operated eccentrically, as it is eccentrically supported by the shaft 9 of which both ends are secured by the bracket 1 and case 8, respectively. This eccentric driving power is transferred via the shaft 9 to the bracket 1, resulting in vibration.

Therefore, it can be seen that the vibration effect of the vibration motor occurs due to the eccentricity of the rotor 10 from the disproportionate concentration of mass caused by the weight 13, etc. Consequently, it is required to increase the eccentricity of the rotor 10 to obtain a greater vibration.

As described above, wound coils 5 are used in a conventional rotor 10, but the wound coils 5 require increased fabrication time and cost. In addition, the wound coils 5 are substantial in volume, causing an increase in volume of the rotor 10 and thus the vibration motor. Furthermore, the coils 5 are generally very thin, of about 45-55 μm, so that the coils 5 often snap during the fabrication process, thus incurring increased defect rate.

Also, as the wound coils 5 must be accurately attached at constant intervals from the center of the board 4, the accurate positioning and attaching of the wound coils 5 cause the problems of increased fabrication time and cost.

In addition, the weight 13 is formed on the board 4 within a limited space, but since the weight 13 is positioned together with the wound coils 5, there is difficulty in increasing the size of the weight 13. In particular, when the size of the weight 13 is increased so as to provide a greater eccentricity of the rotor 10, the size of the wound coils 5 is decreased, causing a reduction in the amount of vibration of the rotor 10. Thus, as seen in FIG. 2a, the rotor 10 is positioned between the wound coils 5 in a limited size, and given a rotor size, there is a limit as to how eccentric the rotor 10 can be made.

SUMMARY

In order to solve the aforementioned problems, the present invention aims to provide a rotor, a vibration motor having the same, and a fabrication method of thereof, which not only allow a reduced volume but also improve vibration performance.

Another object of the invention to provide a rotor, a vibration motor having the same, and a fabrication method of thereof, which can reduce fabrication time and cost.

In order to achieve the above objectives, one aspect of the invention provides a rotor comprising a first layer on which are formed a plurality of commutators, a second to an n-th layer—wherein n is 4 or greater—on which are formed a plurality of patterned coils that are connected with the commutators, insulation layers interposed in-between the first to the n-th layers, blind via holes which connect the commutators of the first layer with the patterned coils formed on the second layer and which connect the patterned coils formed on the (n−1)-th layer with the patterned coils formed on the n-th layer, and a plurality of through holes which connect the patterned coils formed on the second to the (n−1)-th layers, where the patterned coils located on the second to the (n−1)-th layers are connected by means of different through holes.

In certain embodiments, the patterned coils may be arranged on the second to the n-th layers in constant intervals. It may be preferable that the patterned coils formed on the second to the n-th layers be arranged in identical configurations. The number of through holes connecting the patterned coils may be (n−3), and the number of blind via holes may be two.

The blind via holes may be formed on the insides of the patterned coils located on the second to the (n−1)-th layers, in which case the number of through holes located on the outside of the patterned coils may be one more than the number of through holes located on the inside of the patterned coils. The blind via holes may also be formed on the outsides of the patterned coils located on the second to the (n−1)-th layers, in which case the number of through holes located on the insides of the patterned coils may one more than the number of through holes located on the outsides of the patterned coils.

The patterned coils located in symmetrical positions about the center of rotation of the n-th layer may be interconnected. The patterned coils located on the n-th layer have one blind via hole. The insulation layers may be made of pregreg. It may be preferable that the number of commutators formed on the first layer be equal to the number of the patterned coils formed on any one of the second to the n-th layers.

The rotor may further be equipped with a weight, where the weight may be attached to the n-th layer.

The rotor may be composed of a first semicircle of a semicircular shape, and a second semicircle joined with the first semicircle which has a diameter greater than that of the first semicircle. The weight may be located on the second semicircle or on the first semicircle.

In certain embodiments, the weight may comprise a protrusion portion having an outer perimeter equal to a diameter of the second semicircle and an inner perimeter equal to a diameter of the first semicircle, and a body portion having a diameter equal to that of the second semicircle and positioned on the first semicircle. Preferably, the number of winds of the patterned coils located on the second semicircle may be greater than the number of winds of the patterned coils located on the first semicircle. It may be preferable for the central angle of the weight to be 180°. It may also be preferable for the weight to be formed from tungsten. The weight may be secured by a securing member.

Another aspect of the invention provides a rotor comprising a first layer on which are formed a plurality of commutators, a second to an n-th layer—wherein n is 4 or greater—on which are formed a plurality of patterned coils that are connected with the commutators, insulation layers interposed in-between the first to the n-th layers, and through holes which connect the patterned coils formed on the first to the n-th layers, where the patterned coils located on the second to the (n−1)-th layers are connected by means of different through holes.

The number of through holes connecting the patterned coils may be (n−1). Preferably, the patterned coils may be arranged on the second to the (n−1)-th layers in constant intervals. Also, it may be preferable that the patterned coils formed on the second to the (n−1)-th layers be arranged in identical configurations.

The number of through holes located on the inside of the patterned coils may be one more than the number of through holes located on the outside of the patterned coils, or conversely, the number of through holes located on the outside of the patterned coils may be one more than the number of through holes located on the inside of the patterned coils.

The patterned coils located in symmetrical positions about the center of rotation of the n-th layer may be interconnected. The insulation layers may be made of pregreg. A commutator connected to the patterned coils may be formed on the reverse side of the first layer.

The rotor may further comprise a weight, where the weight may be attached to the n-th layer. The rotor may be composed of a first semicircle of a semicircular shape, and a second semicircle joined with the first semicircle which has a diameter greater than that of the first semicircle. The weight may be located on the second semicircle or on the first semicircle.

The weight may comprise a protrusion portion having an outer perimeter equal to a diameter of the second semicircle and an inner perimeter equal to a diameter of the first semicircle, and a body portion having a diameter equal to that of the second semicircle and positioned on the first semicircle. Preferably, the number of winds of the patterned coils located on the second semicircle may be greater than the number of winds of the patterned coils located on the first semicircle. It may be preferable for the weight to have a central angle of 180° and to be formed from tungsten. The weight may be secured by a securing member.

Still another aspect of the invention provides a vibration motor comprising a shaft onto which the rotor is inserted, a housing which secures both ends of the shaft, a magnet secured to the housing and having at least two poles, and a pair of brushes formed in a central cavity portion of the magnet that supplies electric currents to the patterned coils of the rotor.

The rotor may be inserted onto the shaft with a bearing as a medium. Also, a lower portion of the rotor may be supported by a washer inserted onto the shaft.

Yet another aspect of the invention provides a method of fabricating a rotor, comprising stacking a second to an (n−1)-th layer having patterned coils, with insulation layers interposed in-between; forming through holes in the second to the (n−1)-th layers; forming patterned coils on a first and an n-th layer; stacking the first layer on the second layer and the n-th layer on the (n−1)-th layer; and forming blind via holes that connect the first layer with the second layer and the (n−1)-th layer with the n-th layer.

Additional aspects and advantages of the present invention will be set forth in part in the description which follows, and in part will be obvious from the description, or may be learned by practice of the invention.

DETAILED DESCRIPTION

Embodiments of the invention will be described below in more detail, with reference to the accompanying drawings. In the description with reference to the accompanying drawings, those components are rendered the same reference number that are the same or are in correspondence regardless of the figure number, and redundant explanations are omitted.

Figure 1:
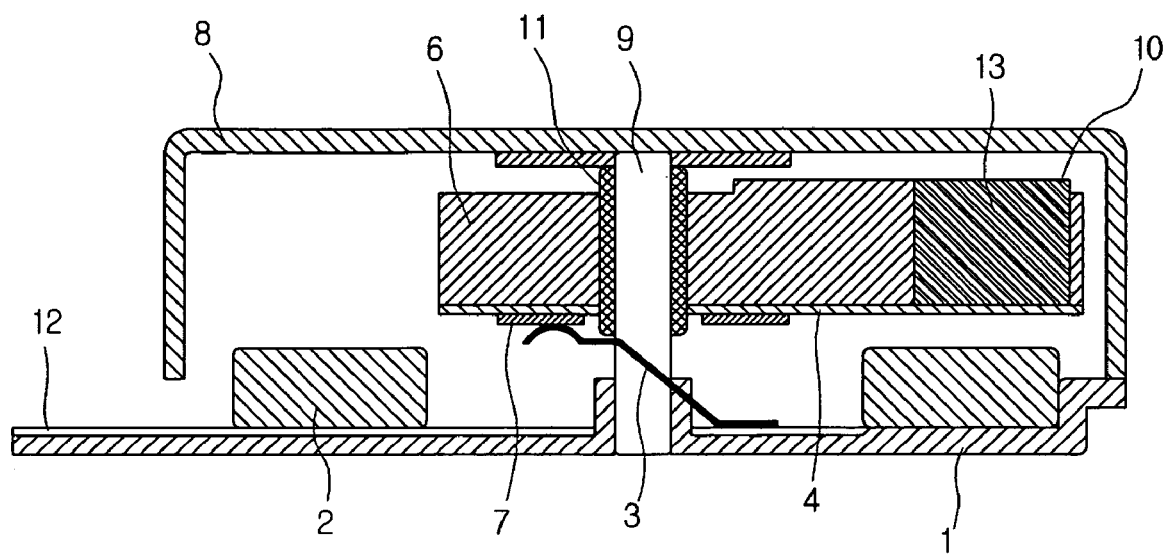
FIG. 1 is a cross-sectional view of a conventional vibration motor.
Figure 2A:
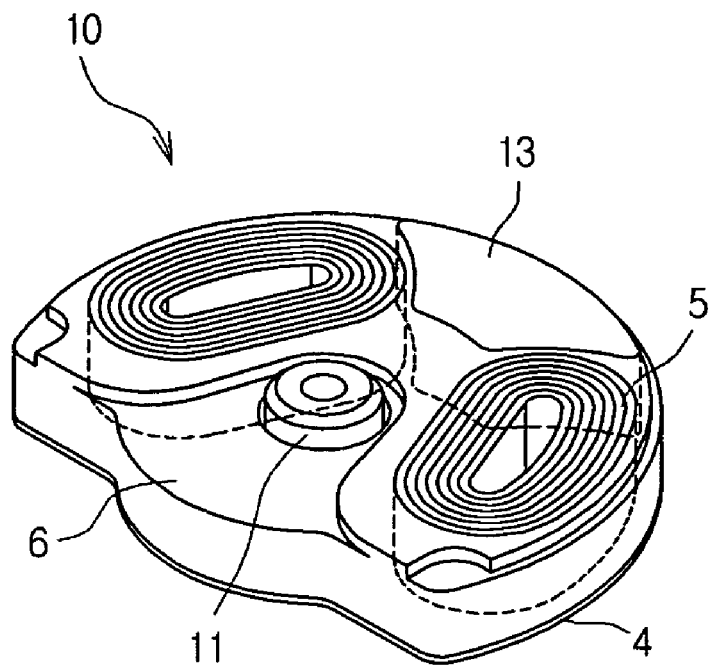
FIG. 2a is a perspective view illustrating the upper portion of a conventional rotor.
Figure 2B:
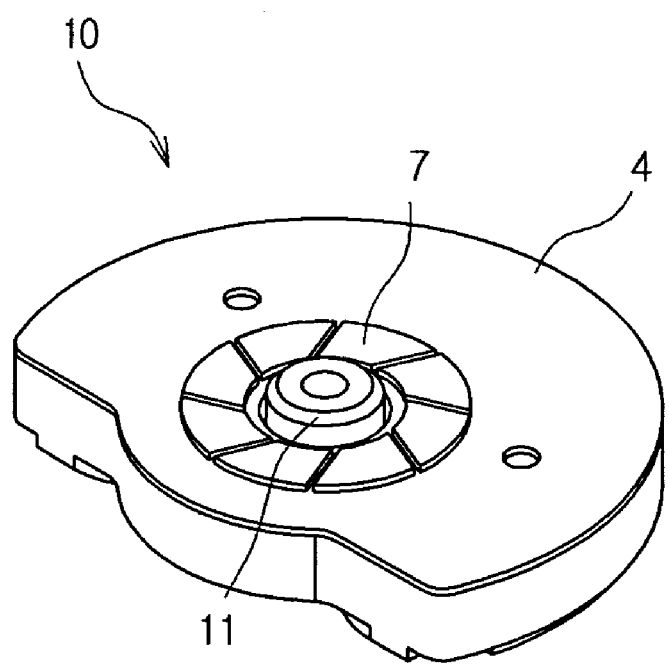
FIG. 2b is a perspective view illustrating the lower portion of a conventional eccentric rotor.
Figure 3A:
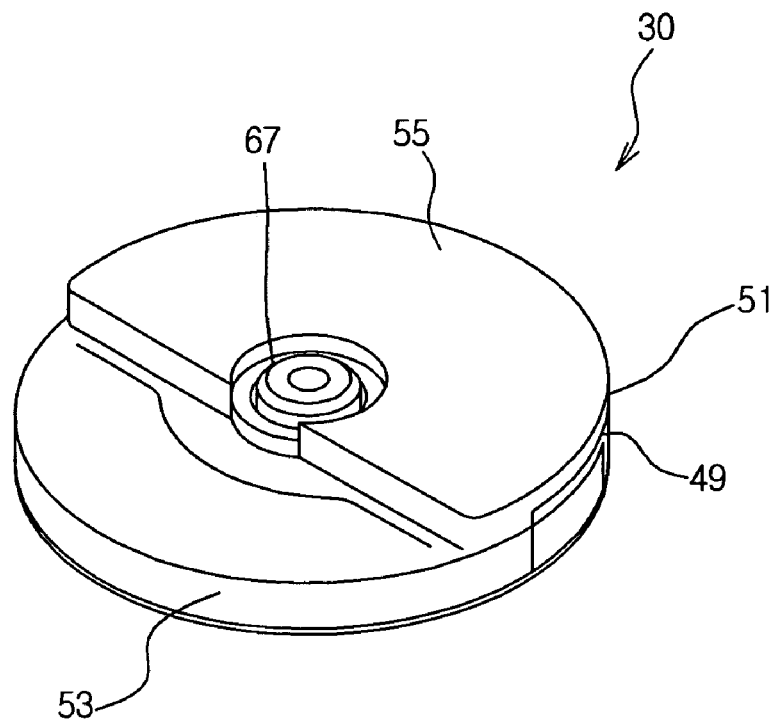
FIG. 3a is a perspective view illustrating the upper portion of a rotor according to an embodiment of the invention.
Figure 3B:
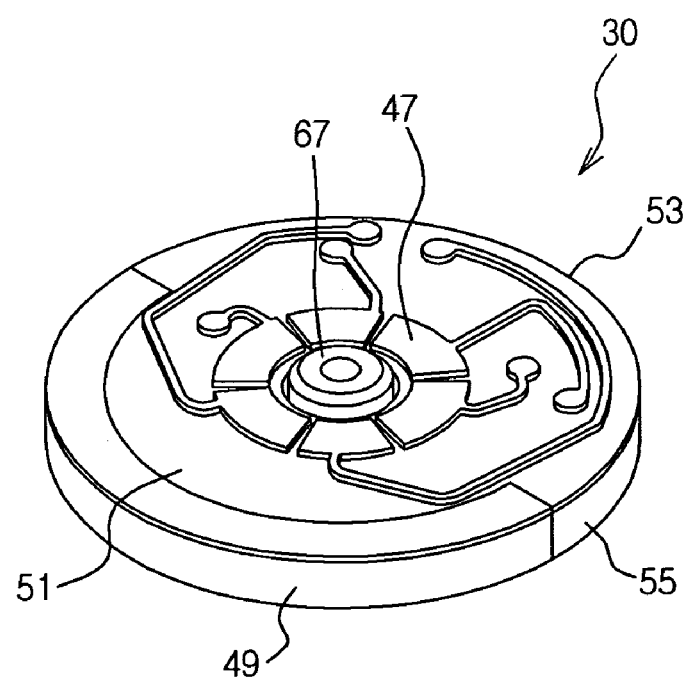
FIG. 3b is a perspective view illustrating the lower portion of a rotor according to an embodiment of the invention.

FIG. 3a is a perspective view illustrating the upper portion of a rotor 30 according to an embodiment of the invention, and FIG. 3b is a perspective view illustrating the lower portion.

The rotor 30 illustrated in FIGS. 3a and 3b is inserted onto the shaft (not shown) of a vibration motor and rotated to generate vibration, and comprises a first to an eighth layer 31-38 on which are formed patterned coils generating an electric field, commutators 47 connected to the patterned coils to supply electric currents, and a weight 49 attached to a surface of the rotor 30 to increase the eccentricity. The rotor 30 is composed of a first semicircle 51 and a second semicircle 53 having different diameters.

The first semicircle 51, which has a diameter shorter than that of the second semicircle 53, joins with the second semicircle 53. The reason for forming the rotor 30 with two semicircles of different diameters is to allow the positioning of the weight 49 on the portion corresponding to the difference in diameters of the second semicircle 53 and the first semicircle 51 and thus further increase the eccentricity of the rotor 30. Since the center of mass of the rotor 30 must be biased in one direction with respect to the center of rotation in order to increase the eccentricity, and thus increase the amount of vibration, it is preferable that the weight 49 be put in as much eccentric a position as possible.

The first and the second semicircles 51, 53 are equal in thickness, and the thicknesses of the first and the second semicircles 51, 53 are determined by the first to the eighth layers 31-38 and the insulation layers (not shown) positioned in-between the first to the eighth layers 31-38. On the first and second semicircles 51, 53 are formed the weight 49 and a securing member 55 which secures the weight 49 to the rotor 30. The number of winds is greater for the patterned coils formed on the first semicircle 51 than for the patterned coils formed on the second semicircle 53. This is because the patterned coils are formed up to the outermost portion of the second semicircle 53 to increase the driving power of the rotor.

While in this embodiment, the rotor 30 is composed of the first and second semicircles 51, 53, the present invention is not thus limited, and any form may be used which renders the rotor 30 eccentric. For example, the central angles of the first semicircle 51 and the second semicircle 53 may respectively be set as 180° or greater and 180° or lower, or vice versa, according to the design conditions of the vibration motor in which the rotor 30 is used.

The weight 49 is positioned on the first semicircle 51 or on the second semicircle 53. The weight 49 is secured at the outermost surface of the rotor 30 by the securing member 55, etc., and increases the eccentricity of the rotor 30. Thus, the weight 49 is preferably formed from a material that has a small volume and great mass, i.e. a material high in density. For example, it may be preferable to fabricate the weight 49 from tungsten, which is high in density. The weight 49 has a protrusion portion 491 and a body portion 493 joined with the protrusion portion 491.

Figure 8:
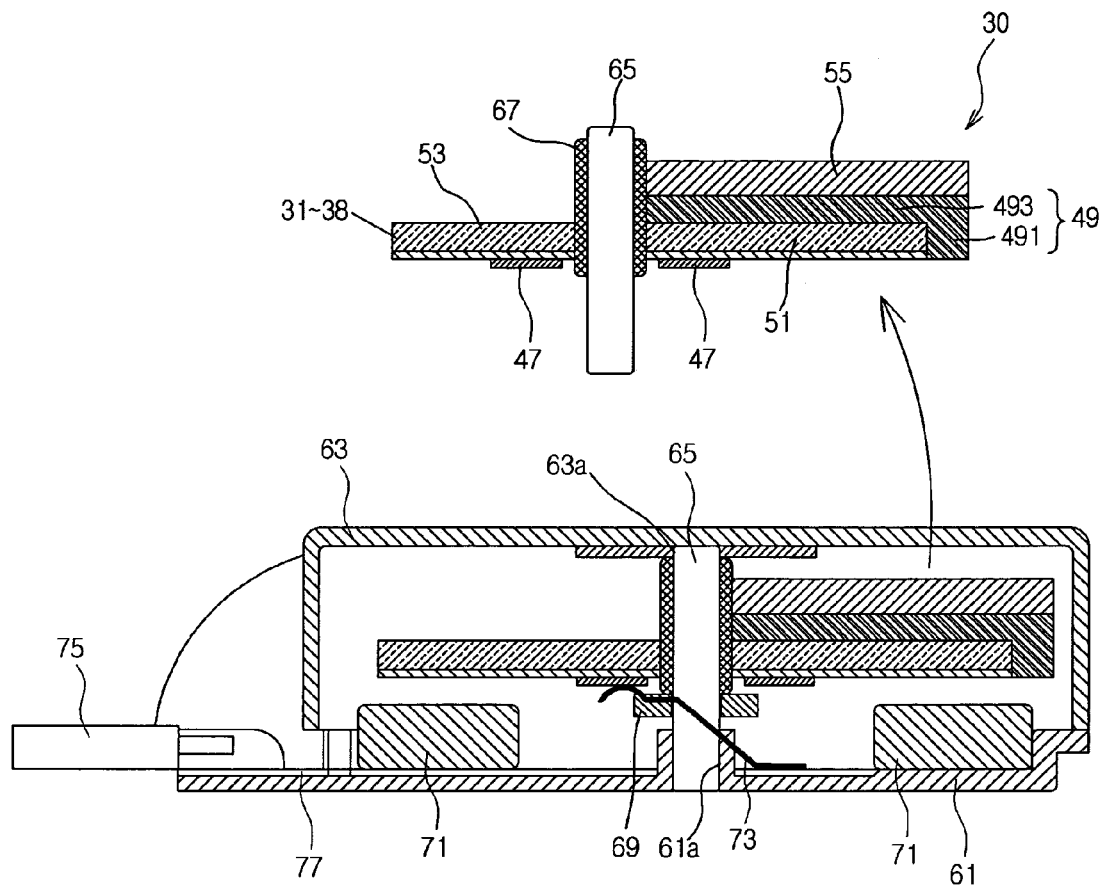
FIG. 8 is a cross-sectional view of a vibration motor according to an embodiment of the invention.

The protrusion portion 491 has an inner perimeter in contact with the first semicircle 51 and an outer perimeter having the same diameter as that of the second semicircle 53. That is, as illustrated in FIG. 8, it is attached to the outer perimeter of the first semicircle 51 and, together with the second semicircle 53, forms a complete circle. Thus, with the rotor 30 according to the present embodiment, the volume of the weight 49 can be increased by the volume of the protrusion portion 491 without increasing the thickness of the rotor 30, so that the eccentricity may be increased further.

The body portion 493 is joined with or is formed as a single body with the protrusion portion 491, and is positioned on the first semicircle 51 or the second semicircle 53. The body portion 493 is secured to the rotor 30 by means of the securing member 55.

The protrusion portion 491 and the body portion 493 have the shape of a fan having the predetermined central angle, where preferably, the central angle does not exceed 180°. This is because when the central angle of the weight 49 exceeds 180°, the eccentricity is offset by the amount of mass corresponding to the exceeding portions.

The securing member 55 is an injection-molded product of plastic resin. It is injected onto the rotor 30 and attaches the weight 49 onto the rotor 30. The height of the securing member 55 may be made equal to the thickness of the weight 49 to reduce the thickness of the rotor 30, or may be made greater than the thickness of the weight 49 to further increase the eccentricity and more firmly secure the weight 49.

The commutators 47, as illustrated in FIG. 3b, are wiring boards with the shape of a flat plate arranged in constant intervals around the center of the rotor 30. The commutators 47 are connected respectively to patterned coils formed on the second layer 32, from among the first to the eighth layers 31-38, to supply an electric current. Thus, the number of commutators 333 may preferably be an integer multiple of the number of patterned coils 332 formed on a single layer. For example, if there are six patterned coils in a patterned coil layer, as illustrated in FIGS. 5a to 5h, the number of commutators 47 formed may be six or twelve.

The first to the eighth layers 31-38 are connected to the commutators 47 to generate an electric field. The first to the eighth layers 31-38 are composed of several patterned coils formed by, for example, photolithography or thick film processes. Thus, since the rotor 30 according to this embodiment does not use wound coils, the fabrication costs may be reduced, the fabrication processes may be simplified, and the defect rate may be reduced. An insulation layer (45 of FIG. 5) is positioned in-between each of the first to the eighth layers 31-38, and the method of connecting each of the layers 31-38 will be described below.

Figure 4:
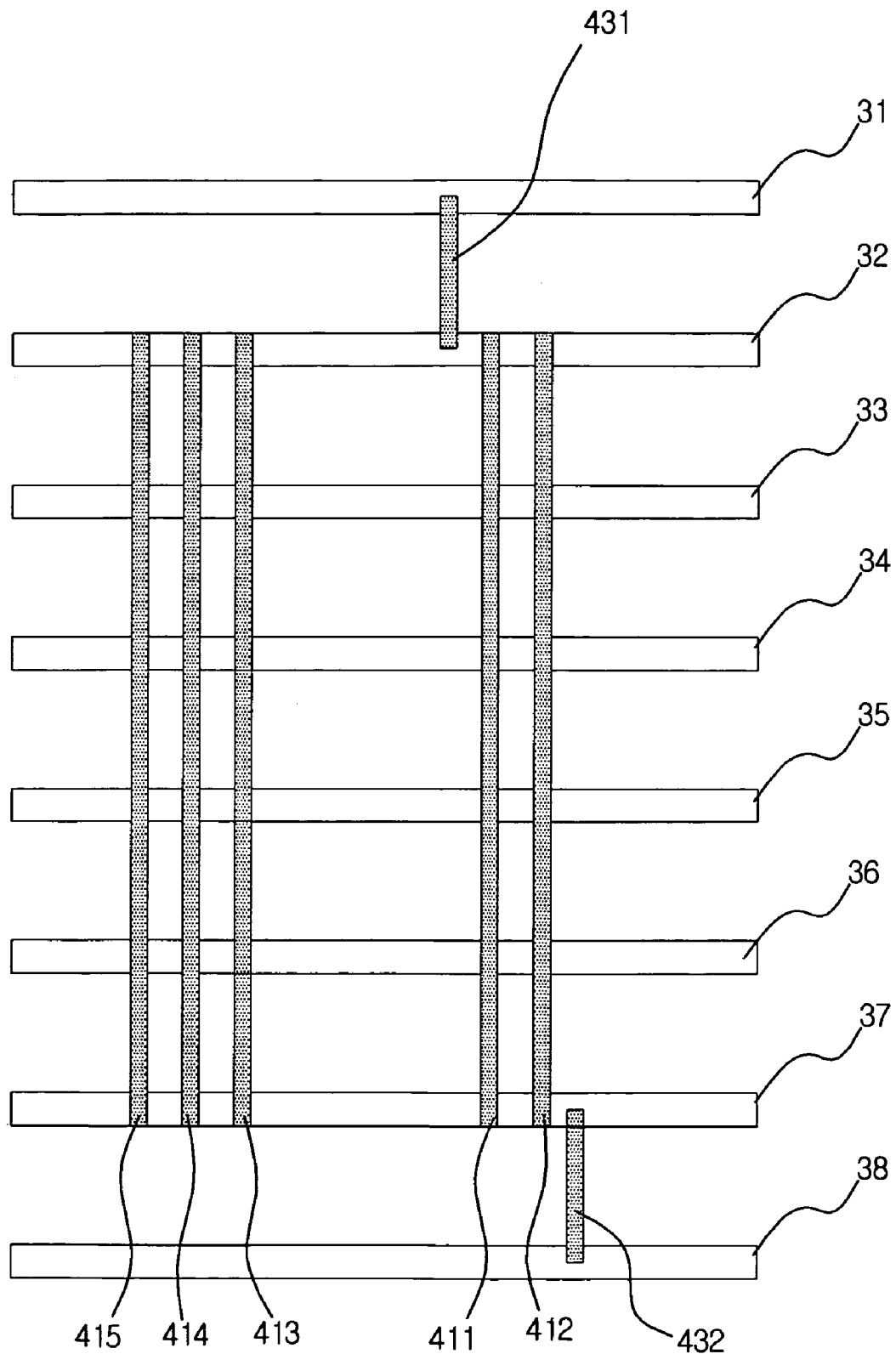
FIG. 4 is a schematic diagram illustrating a cross section of a rotor according to an embodiment of the invention.

FIG. 4 is a schematic diagram illustrating the first to the eighth layers 31-38, according to an embodiment of the invention, connected together.

Insulation layers 45 are interposed in-between the first to the eighth layers 31-38. Also, on the first to the eighth layers 31-38 are formed several patterned coils, as well as through holes 41 and blind via holes that connect the patterned coils.

While the present embodiment is formed to have the first to the eighth layers 31-38, the present invention is not thus limited, and any number of layers may be used such that allows the rotor 30 to produce a desired amount of vibration. For example, various numbers of layers may be used such as 4, 6, or 10, etc. This may be determined according to the permissible thickness and amount of vibration, etc, of the rotor 30.

Plastic resin, such as thermosetting resin, may be used for the insulation layers 45. For example, the insulation layers 45 may be made from any one of epoxy resin, cyanic acid ester resin, bismaleimide resin, polyimide resin, and functional group-containing polyphenylene ether resin, or from a combination thereof.

The through holes 41, as illustrated in FIG. 4, interconnect the second to the seventh layers 32-37. The through holes 41 are generally formed by forming holes, by laser drilling, etc., that penetrate the second to the seventh layers 32-37, and then plating the inner perimeters of the holes using copper, etc. In the rotor 30 according to this embodiment, the second to the seventh layers 32-37 are connected using the through holes, so that the process of interconnecting the layers may be simplified.

The blind via holes connect the first layer 31 with the second layer 32, and the seventh layer 37 with the eighth layer 38. The method of forming the blind via holes is the same as the method of forming the through holes 41. The blind via holes may be located inside or outside the patterned coils (e.g. 321, 371, and 381). When the blind via holes are located inside the patterned coils (321, 371, and 381), the number of through holes located inside the patterned coils is one greater than the number of through holes located outside, and vice versa.

FIGS. 5a to 5h are plan views of the first to the eighth layer 31-38 according to an embodiment of the invention.

Figure 5A:
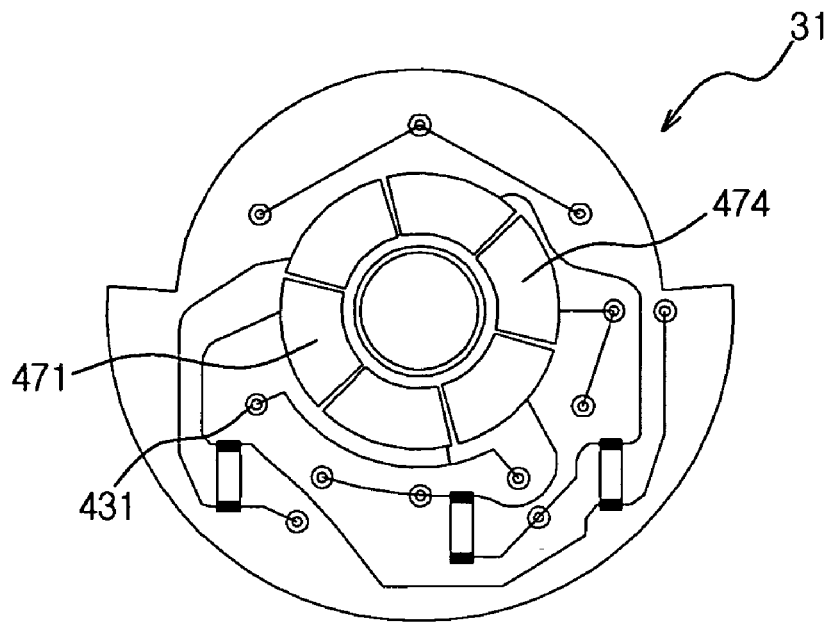
FIG. 5a is a plan view of the first layer according to an embodiment of the invention.
Figure 5B:
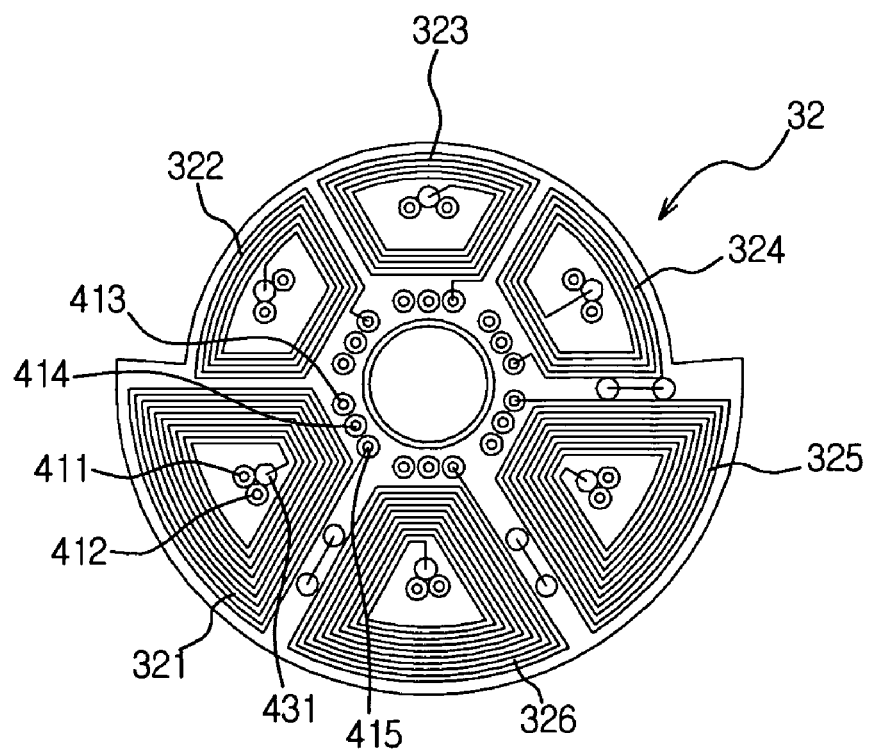
FIG. 5b is a plan view of the second layer according to an embodiment of the invention.
Figure 5C:
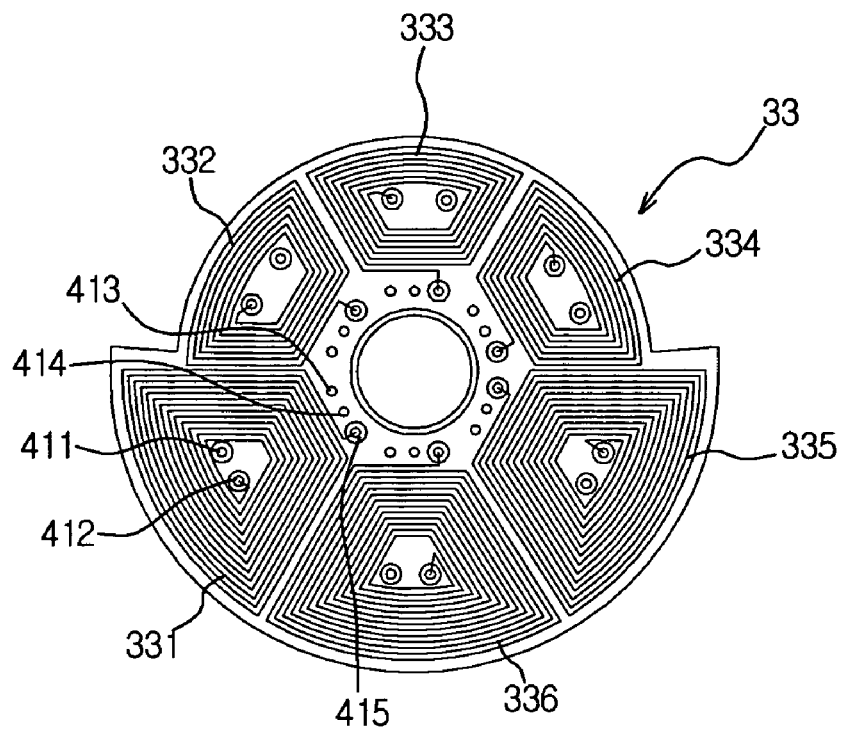
FIG. 5c is a plan view of the third layer according to an embodiment of the invention.

As illustrated in FIG. 5a, commutators 47 supplying electric currents to the patterned coils are arranged radially on the reverse side of the first layer 31, and so also are circuit patterns connected with the commutators 47. Such circuit patterns are connected with the patterned coils of the second layer 32 by means of the blind via holes 43. The blind via holes are also formed on the first layer 31.

As illustrated in FIGS. 5b to 5h, several patterned coils are arranged radially in constant intervals on the second to the eighth layers 32-38. Also, the patterned coils formed on each of the second to the eighth layers 32-38 are arranged identically. This is for the easy forming of the through holes 41 which interconnect the layers 32-38, and for maximizing the number of winds in a patterned coil.

For convenience, numerals will be given in a clockwise direction for the patterned coils formed on each of the layers 32-38. For example, the patterned coils formed on the second layer 32 are given 321, 322, 323, 324, 325, and 326, and the patterned coils formed on the third layer 33 are given 331, 332, 333, 334, 335, and 336. The patterned coil 321 formed on the second layer 32 is connected, by means of the through hole 41, with the patterned coil 331 of the third layer 33, the patterned coil 341 of the fourth layer 34, the patterned coil 351 of the fifth layer 35, the patterned coil 361 of the sixth layer 36, and the patterned coil 371 of the seventh layer 37. The patterned coil 371 of the seventh layer 37 and the patterned coil 381 of the eighth layer 38 are connected by means of the blind via hole 43. The other patterned coils are interconnected in the same manner.

The patterned coil has a trapezoidal shape, with a portion of the circumference having the same arc as the circumference of the layer. Also, several through holes 41 are formed on the insides and outsides of the patterned coils formed on the second to the seventh layers 32-37. The through holes 411, 412 formed on the inside of the patterned coil 321 located on the second layer 32 penetrate the insides of the patterned coils 331, 341, 351, 361, 371 of the third to seventh layers 33-37. The through holes 413, 414, 415 formed on the outside of the patterned coil 321 located on the second layer 32 penetrate the outsides of the patterned coils 331, 341, 351, 361, 371 of the third to seventh layers 33-37. The other patterned coils are interconnected in the same manner.

The blind via holes 431 are formed between the first layer 31 and the second layer 32. The blind via holes 431 are connected with the commutators 47, and are connected with the patterned coils after penetrating the second layer 32. The blind via holes 432 are also formed inside the patterned coils 371, 381 of the seventh layer 37 and the eighth layer 38.

While there are two and three through holes 41 formed inside and outside the patterned coil, respectively, in FIGS. 5a to 5h, the invention is not thus limited, and any configuration may be used with which the patterned coils (e.g. 321, 331, 341, 351, 361, 371) can be interconnected. For example, there may be three and two through holes 41 formed respectively inside and outside the patterned coils (e.g. 321, 331, 341, 351, 361, 371). Also, when there are an n number of stacked layers, the number of through holes 41 is n−3 (where n is 4 or greater). This is because the second layer 32 to the (n−1)-th layer are connected by means of the through holes, with different through holes interconnecting each of the layers.

Figure 5D:
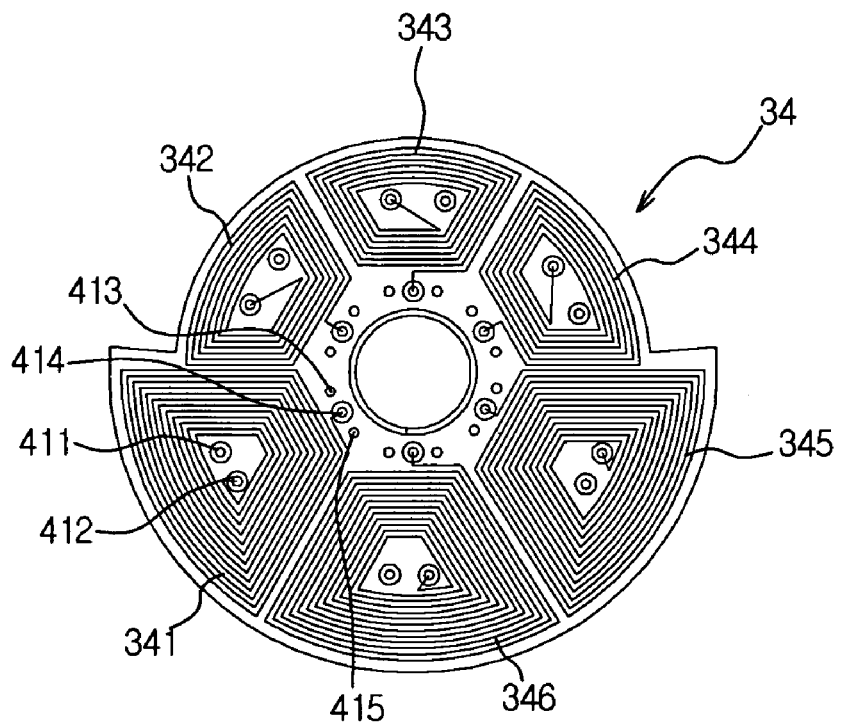
FIG. 5d is a plan view of the fourth layer according to an embodiment of the invention.
Figure 5E:
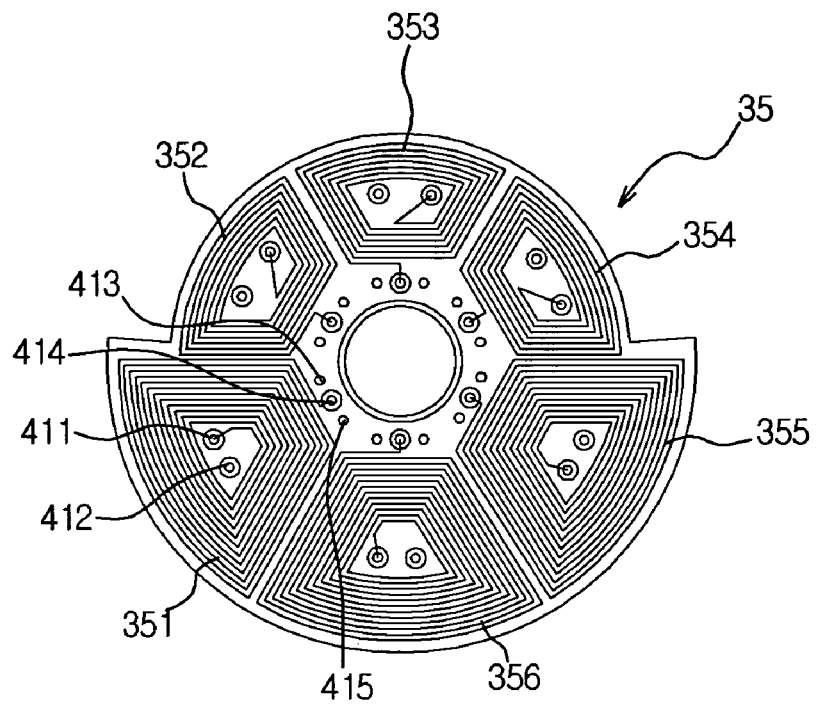
FIG. 5e is a plan view of the fifth layer according to an embodiment of the invention.
Figure 5F:
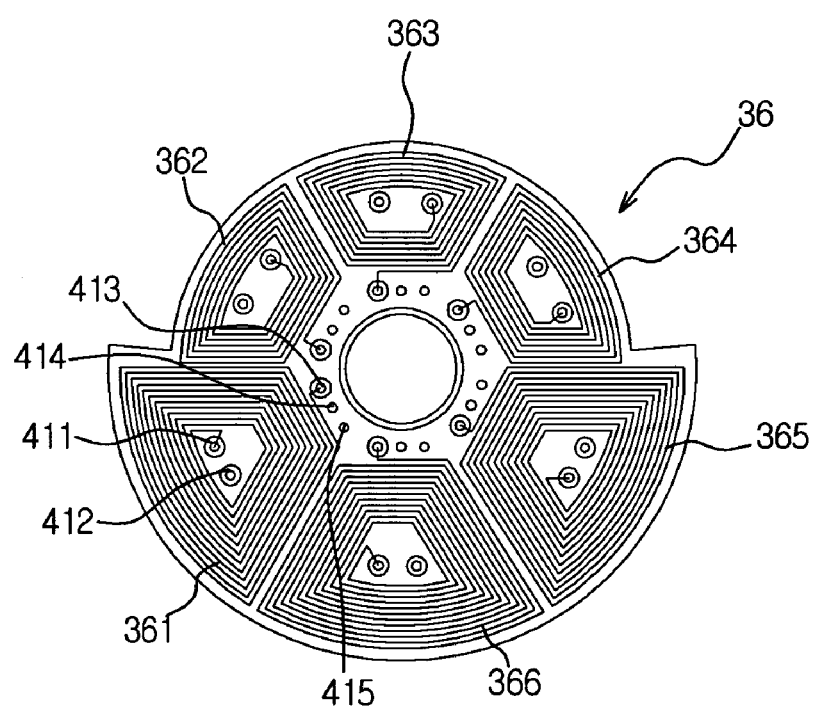
FIG. 5f is a plan view of the sixth layer according to an embodiment of the invention.
Figure 5G:
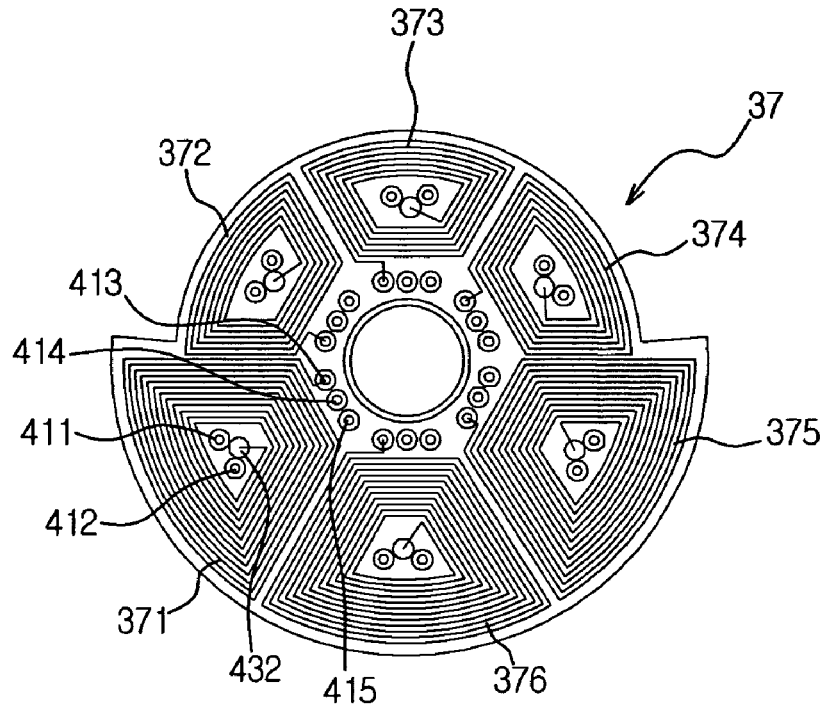
FIG. 5g is a plan view of the seventh layer according to an embodiment of the invention.
Figure 5H:
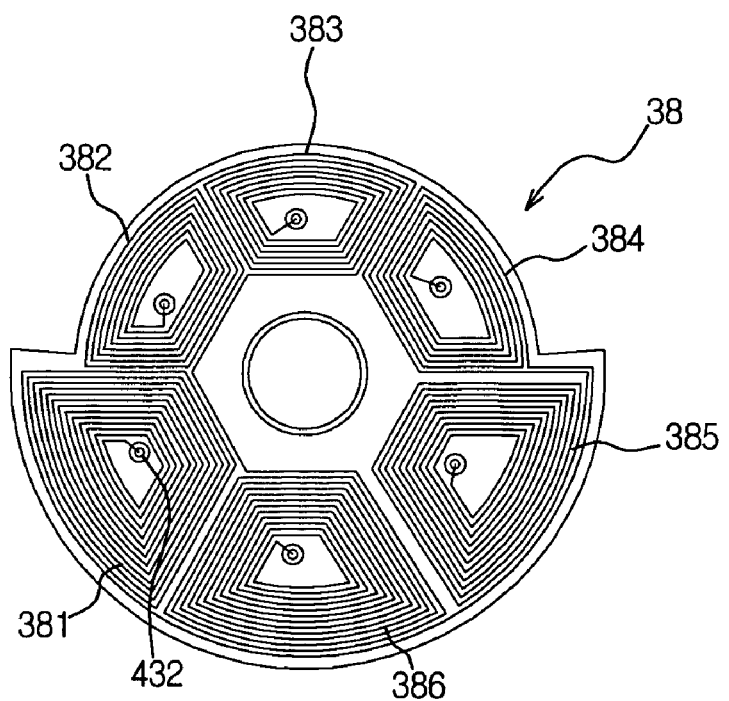
FIG. 5h is a plan view of the eighth layer according to an embodiment of the invention.

As illustrated in FIG. 5h, it is seen that, among the patterned coils 381, 382, 383, 384, 385, and 386 of the eighth layer, the pairs of symmetrical patterned coils are connected to each other. That is, patterned coils 381 and 384 are connected to each other, and so are 382 and 385, as well as 383 and 386. A reason for thus connecting symmetrical patterned coils is so that an electric current supplied via a commutator (e.g. 471), after passing through the patterned coils 321, 331, 341, 351, 361, 371, and 381 of the second to the eighth layers 32-38, is connected again via the patterned coil 384 of the eighth layer 38 to the patterned coils 374, 364, 354, 344, 334, 324 of the seventh to the second layers 37-32 and to the commutator 474. Therefore, the electric current supplied via the commutator 471 flows again to another commutator 474.

Figure 6:
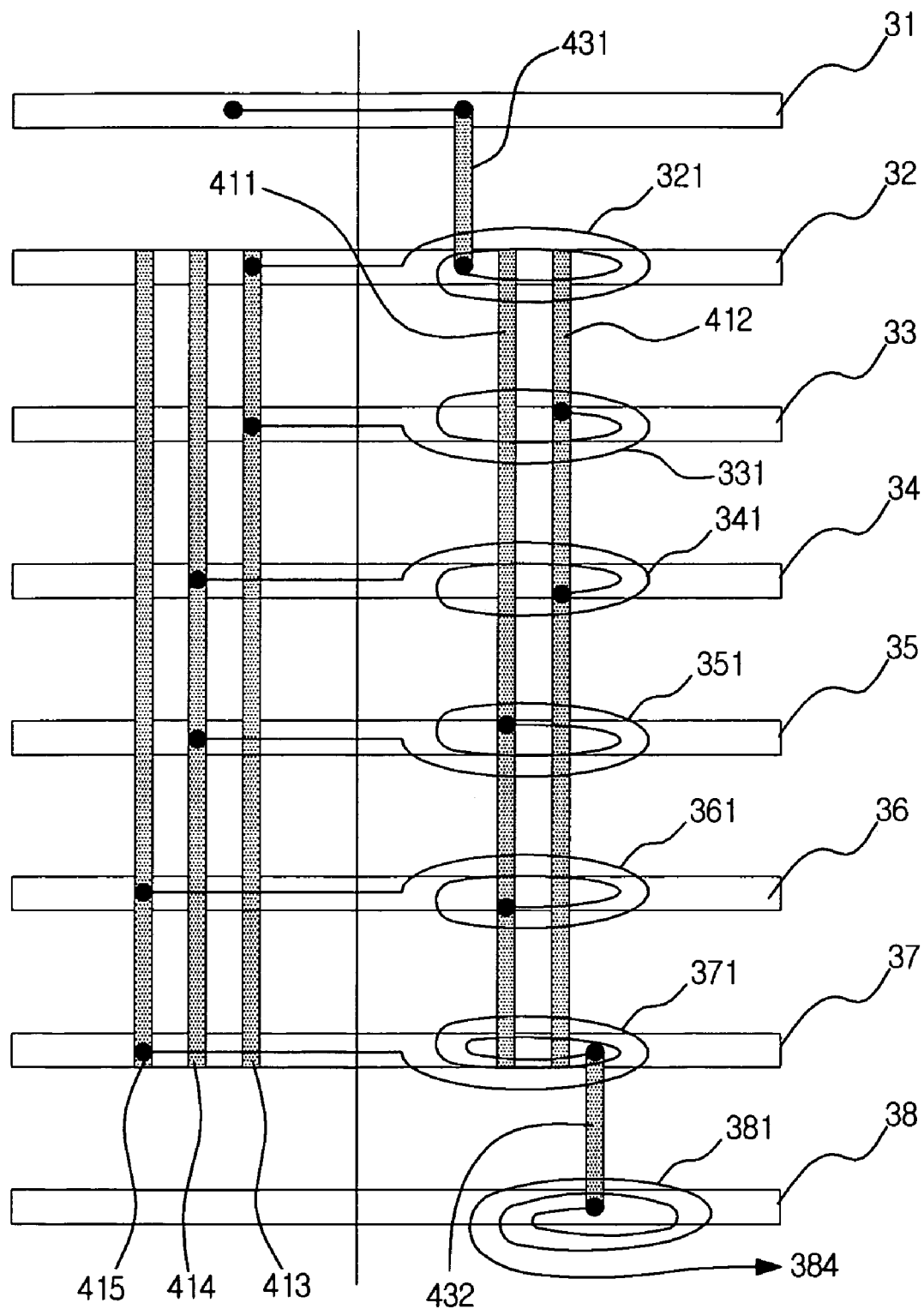
FIG. 6 is a schematic diagram illustrating the first to the eighth layers, and the blind via holes and through holes connecting them, according to an embodiment of the invention.

FIG. 6 is a schematic diagram illustrating the first to the eighth layers 31-38, and the blind via holes 431, 432 and through holes 411, 412, 413, 414, 415 connecting them, according to an embodiment of the invention. A method of connecting the layers of a rotor using patterned coils, according to an embodiment of the invention, will be described with reference to FIGS. 5a to 5h.

As illustrated in FIGS. 5a and 6, an electric current supplied via a commutator 471 formed on the reverse side of the first layer 31 is supplied via the blind via hole 431 to the blind via hole 431 located inside the patterned coil 321 of the second layer 32. It then flows counterclockwise through the patterned coil 321 to the through hole 413 located outside the patterned coil 321. The electric current flows through the through hole 413, as illustrated in FIG. 6, from the second layer 32 to the third layer 33. Then, it passes through the patterned coil 331 in a counter-clockwise direction, after which it is inputted to the through hole 412. The electric current moves through the through hole 412 from the third layer 33 to the fourth layer 34.

The electric current inputted to the fourth layer 34 flows through the through hole 412, as illustrated in FIGS. 5*d* and 6, and passes through the patterned coil 341 to the through hole 414. The through hole 414, as illustrated in FIG. 6, connects the fourth layer 34 with the fifth layer 35. After the electric current flows out of the through hole 414 formed on the fifth layer 35, it passes through the patterned coil 351 in a counter-clockwise direction, to be connected to the through hole 411. The through hole 411, as illustrated in FIG. 6, interconnects the fifth layer 35 and the sixth layer 36.

The electric current inputted to the sixth layer 36, as illustrated in FIG. 5*f*, flows out of the through hole 411 and flows through the patterned coil 361 in a counter-clockwise direction to be connected to the through hole 415. The through hole 415, as illustrated in FIG. 6, connects the sixth layer 36 with the seventh layer 37. The electric current flowing out of the through hole 415 to the patterned coil 371 of the seventh layer 37, as illustrated in FIG. 5*g*, flows counter-clockwise through the patterned coil 371, after which it is connected to the blind via hole 432.

The blind via hole 432, as illustrated in FIG. 6, connects the seventh layer 37 with the eighth layer 38. The electric current inputted to the blind via hole 432 passes through the patterned coil 381 and the symmetrically positioned patterned coil 384 of the eighth layer 38. Afterwards, it passes through the through hole and through the patterned coils 374, 364, 354, 344, 334, and 324 of the seventh to the second layers 37-32, and then flows through the blind via hole formed between the second layer 32 and the first layer 31 to be inputted to the commutator 474.

As illustrated in FIG. 6, all of the patterned coils 321, 331, 341, 351, 361, 371, 381 located on the second to the eighth layers 32-38 are connected by different blind via holes 431, 432 or through holes 411, 412, 413, 414, 415. Therefore, the patterned coils, according to an embodiment of the invention, are serially connected. This increases the resistance value of the patterned coils, blind via holes, and through holes, so that the electric current flowing through the patterned coils may be maintained below a particular value, to prevent the flow of excessive currents in the patterned coils.

Thus, embodiments of the invention enable easy fabrication, since the layers are connected by through holes, provide a simplified fabrication process, since the patterned coils are used instead of the conventional wound coils, and allow reduced volumes of the rotor and the vibration motor.

Figure 7:
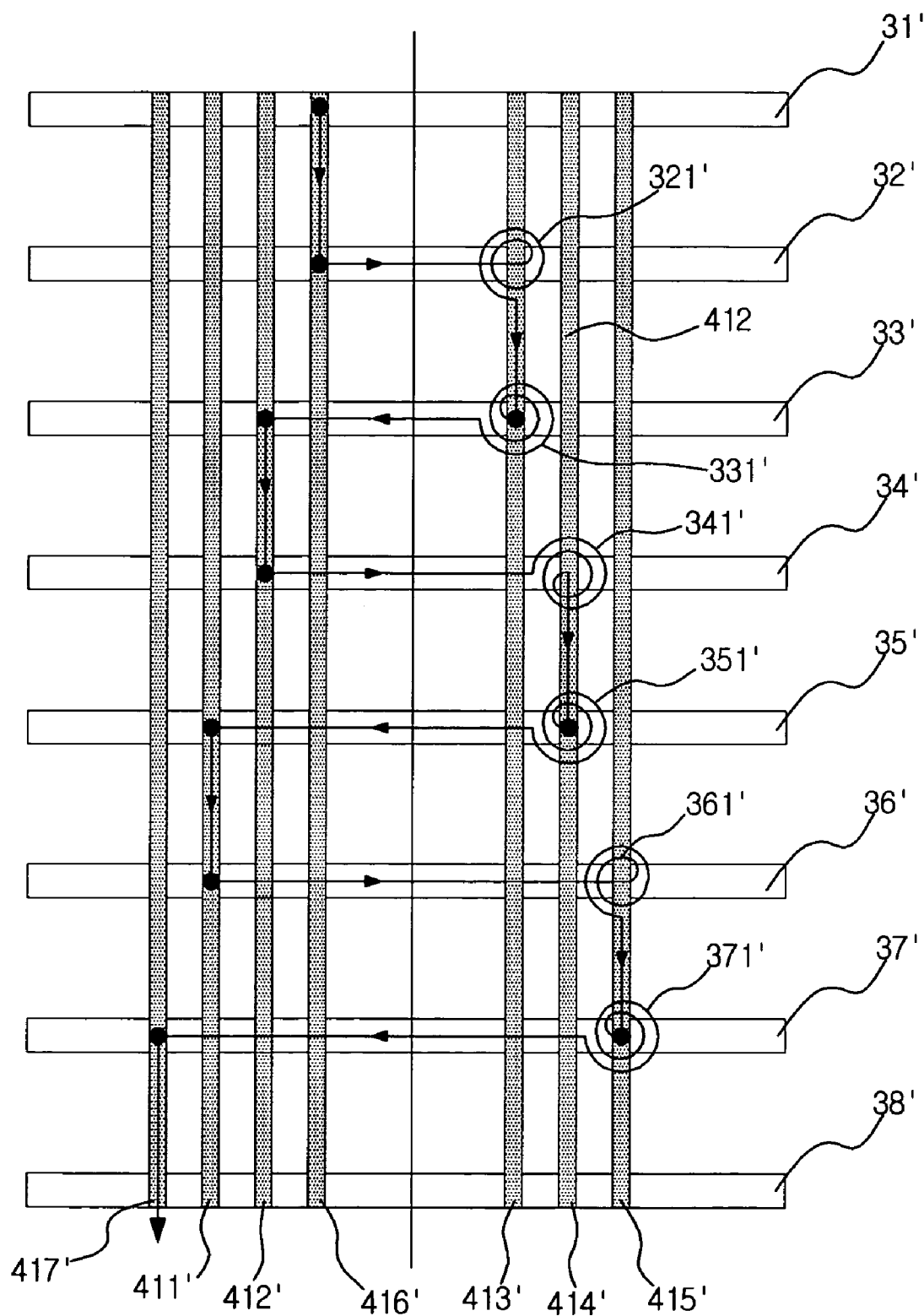
FIG. 7 is a schematic diagram illustrating the layers, and the through holes connecting them, according to another embodiment of the invention.

FIG. 7 is a schematic diagram illustrating a method of connecting layers having patterned coils, according to another embodiment of the invention.

Each layer 31'-38' according to this embodiment of the invention has the same composition as the first to the eighth layers 31-38 illustrated in FIGS. 5*a* to 5*h*, except that through holes 417', 419' are used in connecting the first layer 31' with the second layer 32', and the seventh layer 37' with the eighth layer 38'. That is, as illustrated in FIGS. 5*a* to 5*h*, there are three through holes 413', 414', 415' formed on the outsides of the patterned coils 321', 331', 341', 351', 361', 371', 381' located on the second to the eighth layers 32'-38', and four through holes 411', 412', 416', 417' formed on the insides.

The through holes 411', 412', 413', 414', 415' connect the patterned coils 321', 331', 341', 351', 361', 371' located on the second to the seventh layers 32'-37'. Also, the through hole 416' connects the commutator 471' of the first layer 31' with the patterned coil 321' of the second layer 32', while the through hole 417' connects the patterned coil 371' located on the seventh layer 37' with the patterned coil 381' located on the eighth layer 38'.

As illustrated in FIG. 7, the first layer 31' and the second layer 32' are connected by the through hole 416', while the seventh layer 37' and the eighth layer 38' are connected by the through hole 417'. The second to the seventh layers 32'-37' are connected by the through holes 411', 412', 413', 414', 415', and they are connected in the same manner as in the embodiment illustrated in FIG. 6.

It is seen in FIG. 7 that different through holes are used connect different layers. That is, only one through hole is used in a connection of the first to the eighth layers 31'-38'. Thus, since the resistance value is increased due to the patterned coils and through holes, the electric current flowing through the patterned coils may be maintained below a particular value, to prevent the flow of excessive currents in the patterned coils. Also, the foregoing embodiment of the invention enables easy fabrication, since the layers are connected by through holes, provides a simplified fabrication process, since the patterned coils are used instead of the conventional wound coils, and allows reduced volumes of the rotor and the vibration motor.

FIG. 8 is a cross-sectional view of a vibration motor 60 according to an embodiment of the invention.

The vibration motor according to an embodiment of the invention, as illustrated in FIG. 8, comprises an outer body composed of a bracket 61 and a case 63, a shaft 65 secured to the bracket 61 and case 63, a rotor 30 inserted onto the shaft 65 using a bearing 67 as a medium, a washer 69 inserted onto the shaft 65 which supports the lower portion of the rotor 30, a donut-shaped magnet 71 positioned on the bracket 61, a printed circuit board 77 positioned on the bracket 61, and brushes 73 in contact with a lower portion of the rotor 30 that transfer electric currents supplied through the printed circuit board 77 to the rotor 30.

The bracket 61 and case 63 contain the magnet 71, printed circuit board 77, brushes 73, shaft 65, rotor 30, bearing 67, and washer 69.

In the center of the bracket 61, as illustrated in FIG. 8, there is formed a bracket groove 61*a* into which the shaft 65 is inserted. The lower end of the shaft 65 is inserted and secured in the bracket groove 61*a*. The printed circuit board 77 is positioned on the upper surface of the bracket 61, and the donut-shaped magnet 71 is positioned on the printed circuit board 77. The bracket 61 joins with the case 63.

In the center of the case 63 is formed a case groove 63*a* into which the shaft 65 is inserted. The upper end of the shaft 65 is inserted and secured in the case groove 63*a*. There is a particular amount of space between the lower surface of the case 63 and the upper surface of the securing member 55 of the rotor 30.

The magnet 71 is positioned on the upper surface of the bracket 61. The magnet 71 has the shape of a donut, and within the inside space of the magnet 71 are positioned the brushes 73 and the shaft 65. The magnet 71 is magnetized to have at least two or more poles. To increase the electromagnetic force applied on the rotor 30, the magnet 71 may preferably have four or more poles. The magnet 71 is magnetized to have alternating N/S poles of equal magnitude. The magnet 71 forms a magnetic field, which, together with the electrical field generated by the patterned coils of the rotor 30, generates an electromagnetic force according to Fleming's Left Hand Rule to operate the rotor 30.

The upper and lower ends of the shaft 65 are forced into and secured in the case groove 63*a* and bracket groove 61*a*, respectively, and support the rotor 30 while the rotor 30 is rotated. A bearing 67, which allows smoother rotation of the rotor 30, is inserted onto a predetermined position on the shaft 65 and secured. The bearing 67 is supported by a washer 69 that is also inserted onto the shaft 65 and is joined with the rotor 30 by means of the securing member 55.

A pair of brushes 73 are positioned inside the magnet 71, each of which has one end electrically connected to the printed circuit board 77, and the other end in contact with the commutators 47 formed on the reverse side of the rotor 30. The brushes 73 transfer the current received from the printed circuit board 77 to the commutators 47.

The washer 69 is inserted onto the shaft 65 and secured. The washer 69 supports the rotor 30 while in contact with the lower surface of the rotor 30 or with the bearing 67. Therefore, even when there is an external impact applied on the vibration motor, it is not moved from its original position on the shaft 65, because the rotor 30 is supported by the washer 69.

Figure 9:
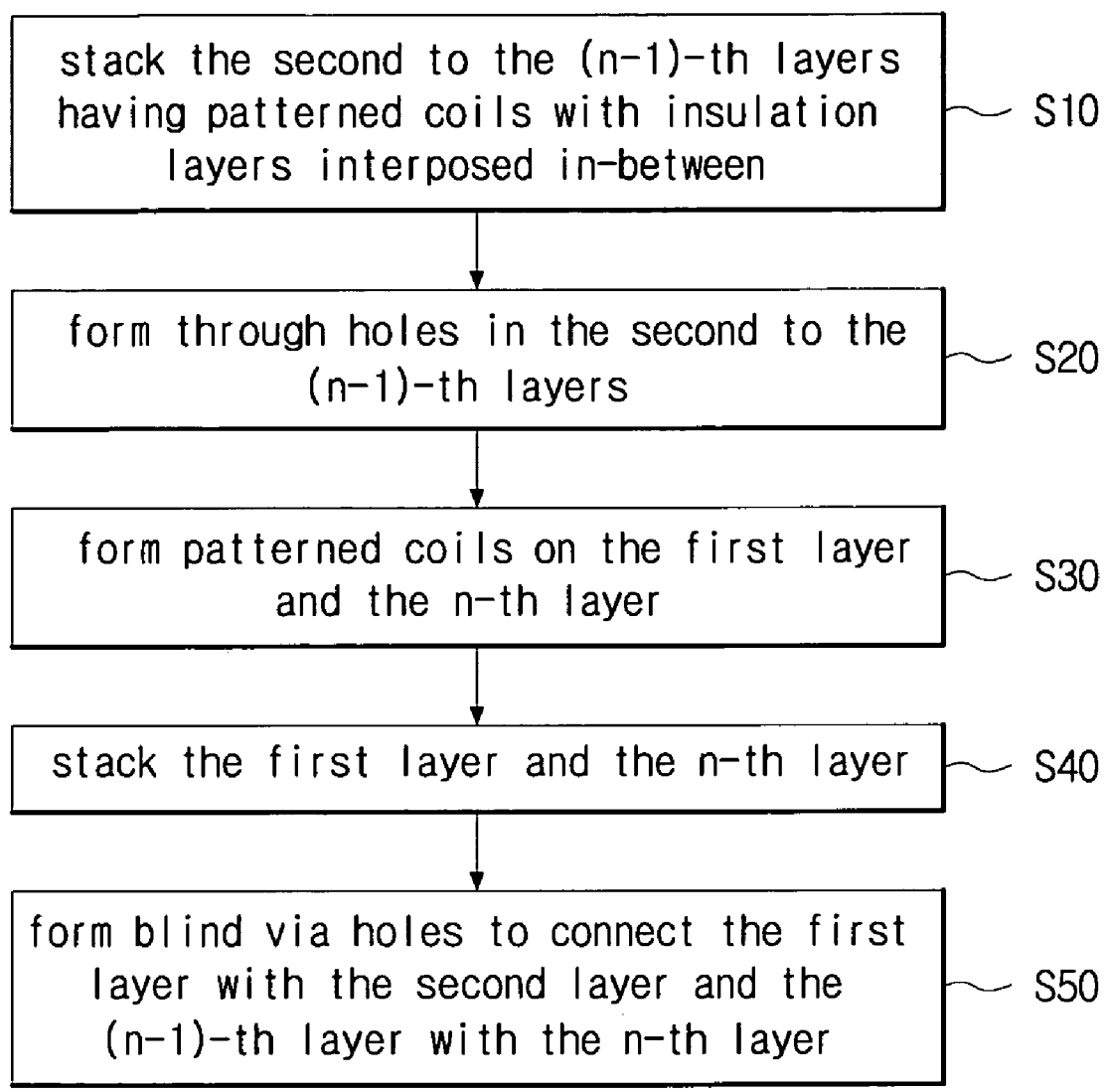
FIG. 9 is a flow diagram illustrating a method of fabricating a rotor according to an embodiment of the invention.

FIG. 9 is a flow diagram illustrating a method of fabricating a rotor according to an embodiment of the invention, and FIGS. 10a to 10d are cross-sectional views illustrating the operations of FIG. 9. While FIG. 9 and FIGS. 10a to 10d illustrate eight layers, the layers may be formed in different numbers as necessary, such as in four, six, ten, or twelve layers, etc.

Figure 10A:
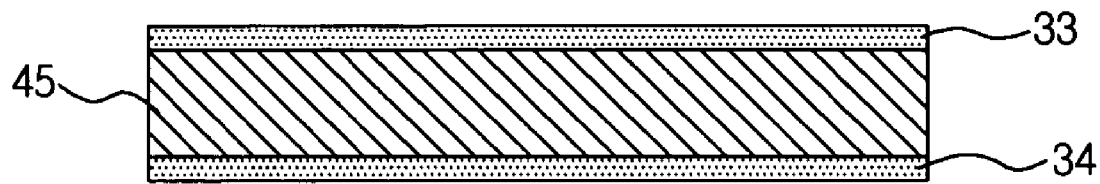
FIG. 10a is a cross-sectional view illustrating the third, fourth, fifth, and sixth layers, on which patterned coils have been formed, with a method of fabricating a rotor according to an embodiment of the invention.
Figure 10A:
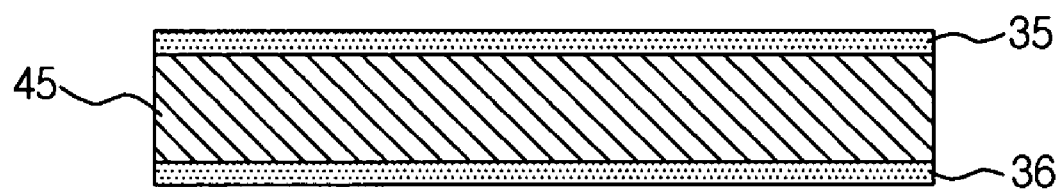
Figure 10B:
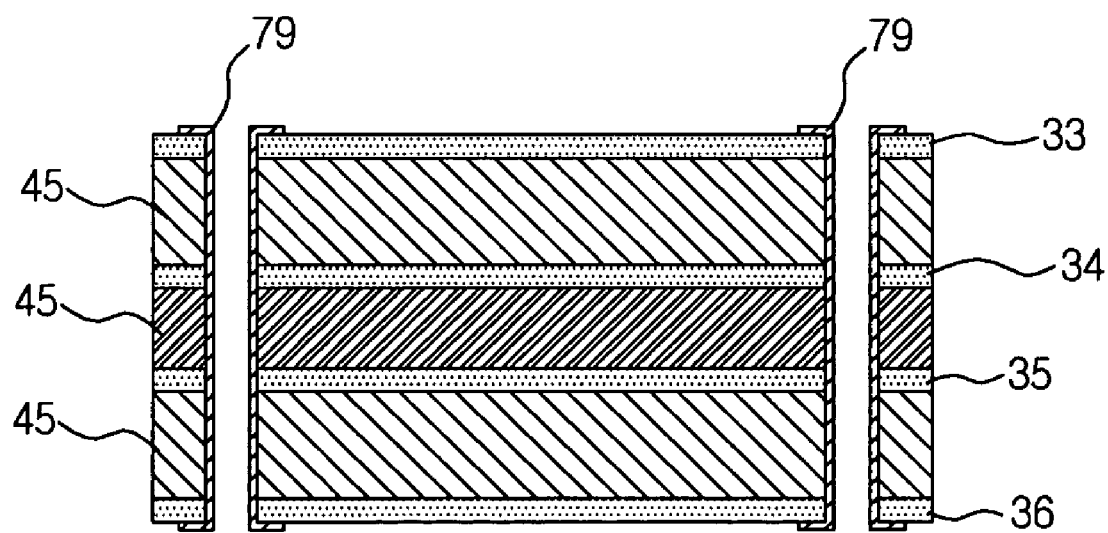
FIG. 10b is a cross-sectional view illustrating the third, fourth, fifth, and sixth layers secured using rivets, with a method of fabricating a rotor according to an embodiment of the invention.
Figure 10C:
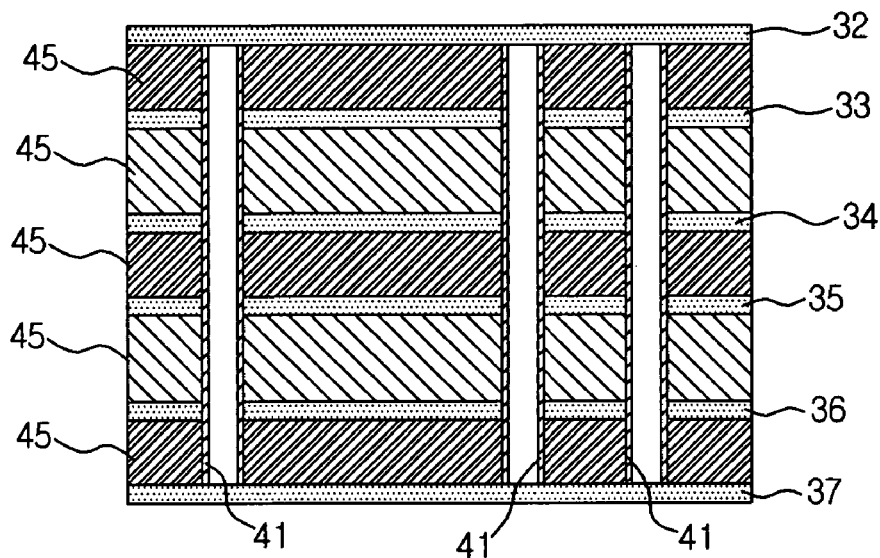
FIG. 10c is a cross-sectional view illustrating the through holes formed after stacking the second and seventh layers, with a method of fabricating a rotor according to an embodiment of the invention.

First, the operation of stacking a second to an (n–1)-th layer having patterned coils with insulation layers interposed in-between (S10) is illustrated in FIGS. 10a to 10c.

As illustrated in FIG. 10a, pattern coils are formed on both sides of a copper clad laminate. These may be formed by photolithography, etc. Insulation layers 45 are positioned between the third layer 33 and the fourth layer 34, and between the fifth layer 35 and the sixth layer 36.

For stacking the second layer 32 and the seventh layer 37, a rivet 79 is inserted which penetrates the third to the sixth layers 33-36, as illustrated in FIG. 10b. The rivet 79 is inserted in a position where there are no patterned coils formed, to prevent the layers from being out of line. Afterwards, high-temperature, high-pressure pressing is used to press insulation layers, such as of prepreg, and copper foil onto both sides of the third to the sixth layers 33-36 secured by the rivet 79, and then the rivet 79 is removed. Further, patterned coils are formed on the copper foil.

The operation of forming through holes on the second to the seventh layers 32-37 (S20) is illustrated in FIG. 10c. As shown in FIG. 10c, the through holes are formed to penetrate the second to the seventh layers 32-37. The insides of the through holes are plated with copper.

Figure 10D:
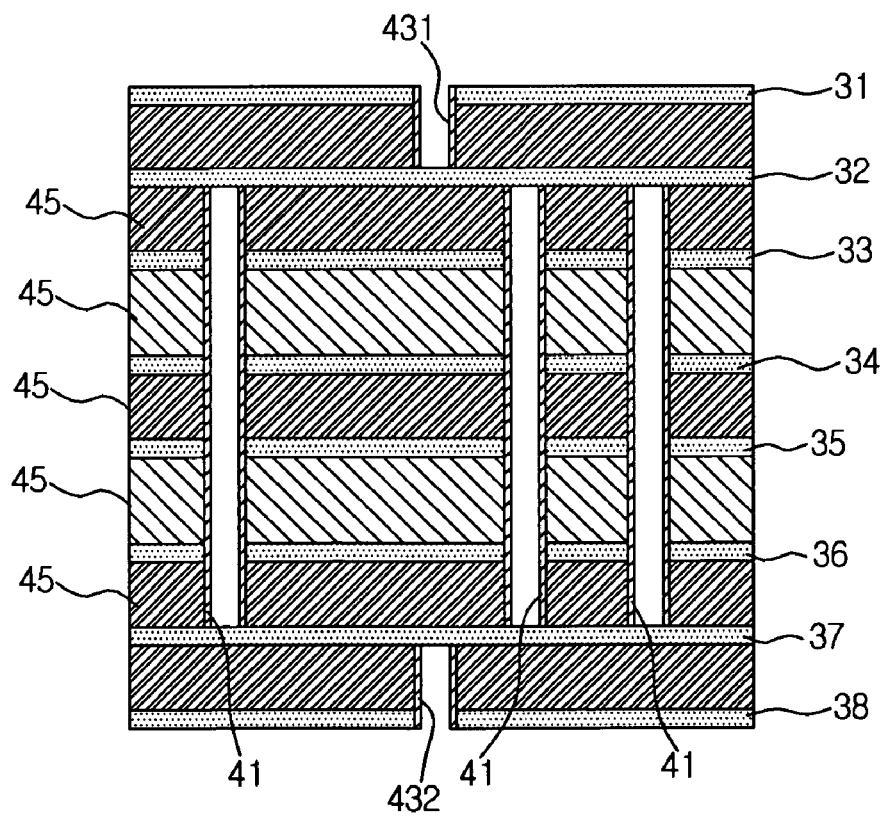
FIG. 10d is a cross-sectional view illustrating the blind via holes formed after stacking the first and eighth layers, with a method of fabricating a rotor according to an embodiment of the invention.

Then, as illustrated in FIG. 10d, patterned coils are formed on the first and eighth layers 31, 38 (S30), after which the first layer 31 and the eighth layer 38 are stacked (S40). Stacking the layers may include stacking insulation layers, such as of prepreg, and copper foil on the upper and lower surfaces of the inner layers secured by the rivet 79, and then applying high-temperature, high-pressure pressing. Next, blind via holes are formed (S50) which connect the first layer 31 with the second layer 32 and the seventh layer 37 with the eighth layer 38.

In the method of fabricating a rotor according to an embodiment of the invention, all of the layers, besides the outermost layers of the first layer and the n-th layer, are connected by means of through holes, so that not only may the process be simplified, but also the production time may be reduced.

According to the present invention comprised as above, a rotor, and a vibration motor having the same may be provided which not only allow a reduced volume but also improve vibration performance.

Also, a rotor, and a vibration motor having the same may be provided which can reduce fabrication time and cost.

While the above description has pointed out novel features of the invention as applied to various embodiments, it shall be understood that various changes and modifications are included within the scope of the invention, as long as they are implementations of the spirit of the invention.

What is claimed is:

1. A rotor comprising:
   a first layer having a plurality of commutators formed thereon;
   a second to an n-th layer—wherein n is 4 or greater—having a plurality of patterned coils formed thereon, the patterned coils connected with the commutators;
   insulation layers interposed in-between the first to the n-th layers;
   blind via holes configured to connect the commutators of the first layer with the patterned coils formed on the second layer and connect the patterned coils formed on the (n–1)-th layer with the patterned coils formed on the n-th layer; and
   a plurality of through holes configured to connect the patterned coils formed on the second to the (n–1)-th layers, wherein the patterned coils located on the second to the (n–1)-th layers are connected by means of different through holes.

2. The rotor of claim 1, wherein the patterned coils are arranged on the second to the n-th layers in constant intervals.

3. The rotor of claim 2, wherein the patterned coils formed on the second to the n-th layers are arranged in identical configurations.

4. The rotor of claim 1, wherein the number of through holes connecting the patterned coils is (n–3), and the number of blind via holes is two.

5. The rotor of claim 1, wherein the blind via holes are formed on the insides of the patterned coils located on the second to the (n–1)-th layers.

6. The rotor of claim 1, wherein the blind via holes are formed on the outsides of the patterned coils located on the second to the (n–1)-th layers.

7. The rotor of claim 5, wherein the number of through holes located on the outside of the patterned coils is greater by one than the number of through holes located on the inside of the patterned coils.

8. The rotor of claim 6, wherein the number of through holes located on the inside of the patterned coils is greater by one than the number of through holes located on the outside of the patterned coils.

9. The rotor of claim 1, wherein the patterned coils located in symmetrical positions about the center of rotation of the n-th layer are interconnected.

10. The rotor of claim 1, wherein the patterned coils located on the n-th layer have one blind via hole.

11. The rotor of claim 1, wherein the insulation layers are made of pregreg.

12. The rotor of claim 1, wherein the number of the commutators formed on the first layer is equal to the number of the patterned coils formed on any one of the second to the n-th layers.

13. The rotor of claim 1, further comprising a weight, wherein the weight is attached to the n-th layer.

14. The rotor of claim 13, composed of a first semicircle of a semicircular shape;
   and a second semicircle joined with the first semicircle and having a greater diameter than that of the first semicircle.

15. The rotor of claim 14, wherein the weight is located on the second semicircle.

16. The rotor of claim 14, wherein the weight is located on the first semicircle.

17. The rotor of claim 16, wherein the weight comprises:
a protrusion portion having an outer perimeter equal to a diameter of the second semicircle and having an inner perimeter equal to a diameter of the first semicircle; and
a body portion having a diameter equal to that of the second semicircle and positioned on the first semicircle.

18. The rotor of claim 14, wherein the number of winds of the patterned coils located on the second semicircle is greater than the number of winds of the patterned coils located on the first semicircle.

19. The rotor of claim 14, wherein the weight has a central angle of 180°.

20. The rotor of claim 13, wherein the weight is formed from tungsten.

21. The rotor of claim 13, wherein the weight is secured by a securing member.

22. A vibration motor having the rotor according to claim 1, the vibration motor comprising:
a shaft onto which the rotor is inserted;
a housing configured to secure both ends of the shaft;
a magnet secured to the housing and having at least two poles; and
a pair of brushes formed in a central cavity portion of the magnet and configured to supply electric currents to patterned coils of the rotor.

23. The vibration motor of claim 22, wherein the rotor is inserted onto the shaft with a bearing as a medium.

24. The vibration motor of claim 23, wherein a lower portion of the rotor is supported by a washer inserted onto the shaft.

* * * * *